(12) United States Patent
Gutterman

(10) Patent No.: US 6,409,467 B1
(45) Date of Patent: Jun. 25, 2002

(54) WIND-GENERATED POWER SYSTEM

(76) Inventor: Howard Gutterman, P.O. Box 230881 Ansonia Station, New York, NY (US) 10023

( * ) Notice: Subject to any disclaimer, the term of this patent is extended or adjusted under 35 U.S.C. 154(b) by 0 days.

(21) Appl. No.: 09/802,574

(22) Filed: Mar. 9, 2001

(51) Int. Cl.[7] .............................. F03D 1/00; H02P 9/04
(52) U.S. Cl. ...................................... 415/4.3; 290/1 R
(58) Field of Search .................... 290/1 R; 415/4.1, 415/4.2, 4.3, 4.4, 4.5

(56) References Cited

U.S. PATENT DOCUMENTS

| | | | |
|---|---|---|---|
| 2,616,506 A | * 11/1952 | Mathias | ............ 415/4.5 X |
| 3,720,840 A | * 3/1973 | Gregg | ............ 415/4.3 X |
| 3,876,925 A | * 4/1975 | Stoeckert | ............ 415/4.4 X |
| 3,883,750 A | * 5/1975 | Uzzell, Jr. | ............ 415/4.5 X |
| 4,012,163 A | 3/1977 | Baumgartner et al. | |
| 4,516,907 A | * 5/1985 | Edwards | ............ 415/4.5 |
| 4,739,179 A | 4/1988 | Stites | |
| 5,038,049 A | 8/1991 | Kato | |
| 5,134,305 A | 7/1992 | Senehi | |
| 5,272,378 A | 12/1993 | Wither | ............ 290/1 R |
| 5,386,146 A | * 1/1995 | Hickey | ............ 290/1 R X |
| 5,734,202 A | 3/1998 | Shuler | ............ 290/1 R X |

* cited by examiner

Primary Examiner—John E. Ryznic

(57) ABSTRACT

A wind-generated power system for producing supplemental electrical power from wind-producing resource. The wind-generated power system includes a subway system tunnel having a wall and support structure with wind being generated by subway trains passing or traveling at high rates of speed therethrough; and also includes wind-collecting ducts being spaced throughout the subway system tunnel and being attached to the wall and support structure; and further includes shrouds being mounted to the wall and support structure and being connected to the wind-collecting ducts; and also includes turbine generators being mounted in the shrouds and being adapted to transform wind to electrical power.

7 Claims, 2 Drawing Sheets

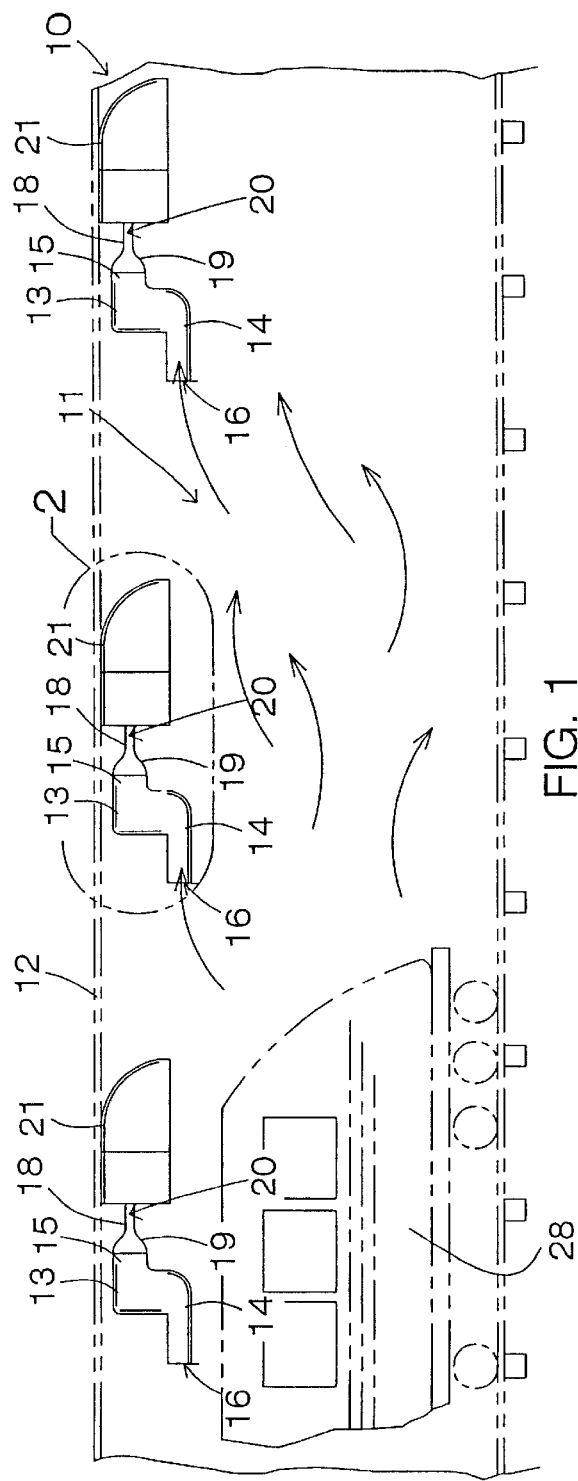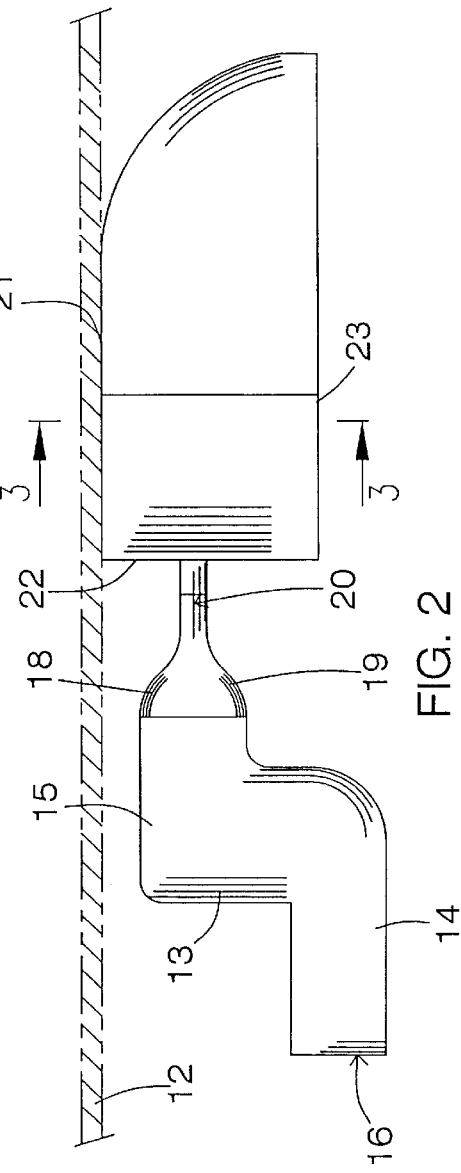

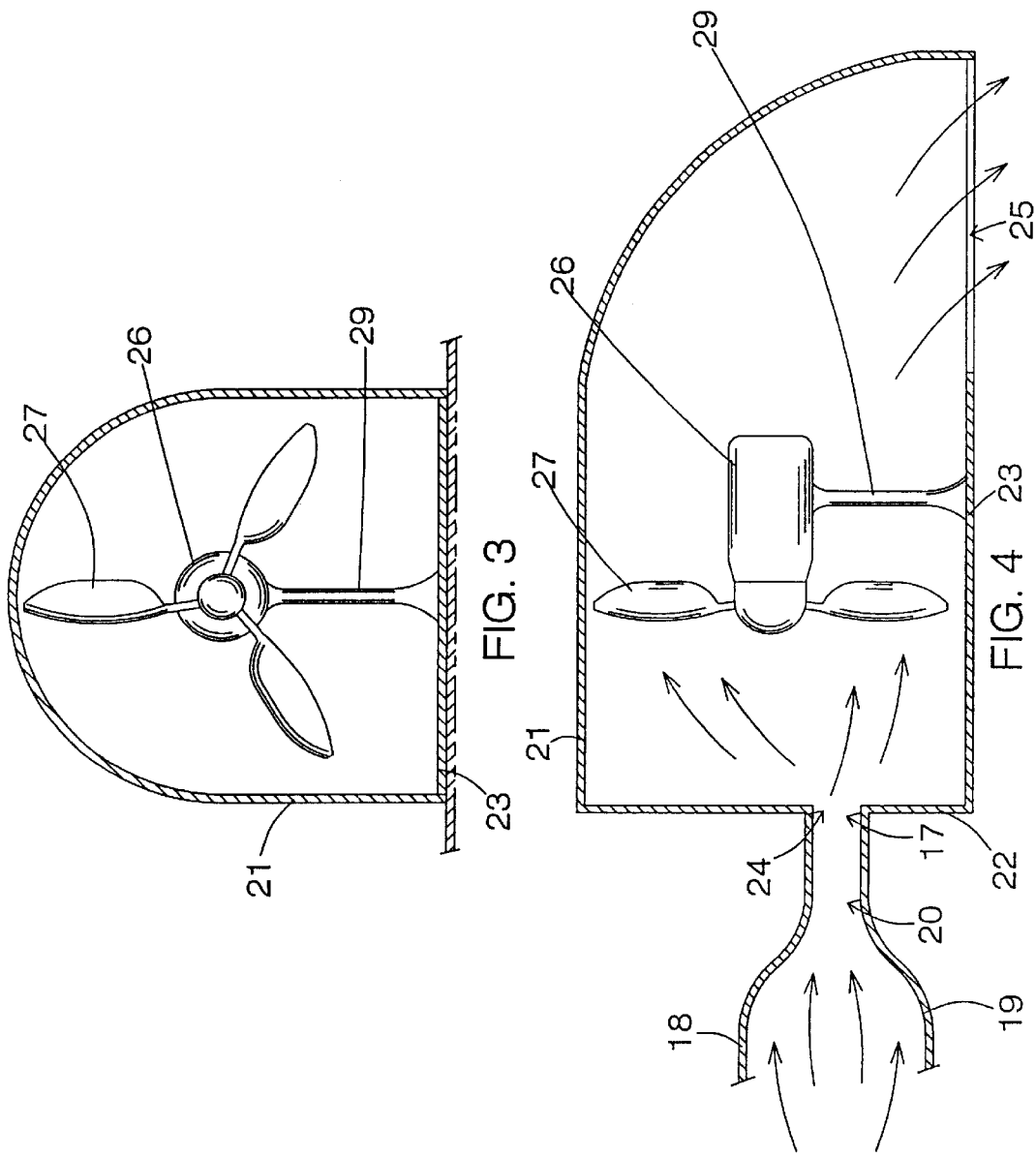

WIND-GENERATED POWER SYSTEM

BACKGROUND OF THE INVENTION

1. Field of the Invention

The present invention relates to a subway wind-generated power system and more particularly pertains to a new wind-generated power system for producing supplemental electrical power from wind-producing resource.

2. Description of the Prior Art

The use of a subway wind-generated power system is known in the prior art. More specifically, a subway wind-generated power system heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,739,179; U.S. Pat. No. 5,272,378; U.S. Pat. No. 5,734,202; U.S. Pat. No. 4,012,163; U.S. Pat. No. 5,038,049; and U.S. Pat. No. 5,134,305.

While these devices fulfill their respective, particular objectives and requirements, the aforementioned patents do not disclose a new wind-generated power system. The inventive device includes a subway system tunnel having a wall and support structure with wind being generated by subway trains passing or traveling at high rates of speed therethrough; and also includes wind-collecting ducts being spaced throughout the subway system tunnel and being attached to the wall and support structure; and further includes shrouds being mounted to the wall and support structure and being connected to the wind-collecting ducts; and also includes turbine generators being mounted in the shrouds and being adapted to transform wind to electrical power.

In these respects, the wind-generated power system according to the present invention substantially departs from the conventional concepts and designs of the prior art, and in so doing provides an apparatus primarily developed for the purpose of producing supplemental electrical power from wind-producing resource.

SUMMARY OF THE INVENTION

In view of the foregoing disadvantages inherent in the known types of subway wind-generated power system now present in the prior art, the present invention provides a new wind-generated power system construction wherein the same can be utilized for producing supplemental electrical power from wind-producing resource.

The general purpose of the present invention, which will be described subsequently in greater detail, is to provide a new wind-generated power system which has many of the advantages of the subway wind-generated power system mentioned heretofore and many novel features that result in a new wind-generated power system which is not anticipated, rendered obvious, suggested, or even implied by any of the prior art subway wind-generated power systems, either alone or in any combination thereof.

To attain this, the present invention generally comprises a subway system tunnel having a wall and support structure with wind being generated by subway trains passing or traveling at high rates of speed therethrough; and also includes wind-collecting ducts being spaced throughout the subway system tunnel and being attached to the wall and support structure; and further includes shrouds being mounted to the wall and support structure and being connected to the wind-collecting ducts; and also includes turbine generators being mounted in the shrouds and being adapted to transform wind to electrical power.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wind-generated power system which has many of the advantages of the subway wind-generated power system mentioned heretofore and many novel features that result in a new wind-generated power system which is not anticipated, rendered obvious, suggested, or even implied by any of the prior art subway wind-generated power systems, either alone or in any combination thereof.

It is another object of the present invention to provide a new wind-generated power system which may be easily and efficiently manufactured and marketed.

It is a further object of the present invention to provide a new wind-generated power system which is of a durable and reliable construction.

An even further object of the present invention is to provide a new wind-generated power system which is susceptible of a low cost of manufacture with regard to both materials and labor, and which accordingly is then susceptible of low prices of sale to the consuming public, thereby making such wind-generated power system economically available to the buying public.

Still yet another object of the present invention is to provide a new wind-generated power system which provides in the apparatuses and methods of the prior art some of the advantages thereof, while simultaneously overcoming some of the disadvantages normally associated therewith.

Still another object of the present invention is to provide a new wind-generated power system for producing supplemental electrical power from wind-producing resource.

Yet another object of the present invention is to provide a new wind-generated power system which includes a subway system tunnel having a wall and support structure with wind being generated by subway trains passing or traveling at high rates of speed therethrough; and also includes wind-collecting ducts being spaced throughout the subway system tunnel and being attached to the wall and support structure; and further includes shrouds being mounted to the wall and support structure and being connected to the wind-collecting ducts; and also includes turbine generators being mounted in the shrouds and being adapted to transform wind to electrical power.

Still yet another object of the present invention is to provide a new wind-generated power system that effectively makes use of the wind produced by subway trains traveling at high rates of speed through the subway system tunnels.

Even still another object of the present invention is to provide a new wind-generated power system that would provide a continuous power generation as subway trains continuously pass through their subway system tunnels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a new wind-generated power system according to the present invention.

FIG. 2 is a detailed side elevational view of the present invention.

FIG. 3 is a lateral cross-sectional view of the present invention.

FIG. 4 is a longitudinal cross-sectional view of the present invention.

DESCRIPTION OF THE PREFERRED EMBODIMENT

With reference now to the drawings, and in particular to FIGS. 1 through 4 thereof, a new wind-generated power system embodying the principles and concepts of the present invention and generally designated by the reference numeral 10 will be described.

As best illustrated in FIGS. 1 through 4, the wind-generated power system 10 generally comprises a subway system tunnel 11 having a wall and support structure 12 with wind being generated by subway trains 28 passing or traveling at high rates of speed therethrough. Wind-collecting ducts 13 are conventionally spaced throughout the subway system tunnel 11 and are conventionally attached to the wall and support structure 12. Each of the wind-collecting ducts 13 includes a wind intake opening 16 and a wind outlet opening 17, and also includes a venturi 18 being conventionally disposed near the wind outlet opening 17 to accelerate the wind being collected through the wind intake opening 16. Each venturi 18 is generally a funnel 19 having a constricted passageway 20 through which the wind is accelerated upon leaving the wind-collecting duct 13. Each of the wind-collecting ducts 13 is generally sinusoidal-shaped having a wind intake portion 14 being conventionally disposed in the subway system tunnel 11, and further having a wind outlet portion 15 being conventionally disposed upon the wall and support structure 12.

Shrouds 21 are conventionally mounted to the wall and support structure 12 and are conventionally connected to the wind-collecting ducts 13. Each of the shrouds 21 includes a front wall 22 and a bottom wall 23, and also includes a hole 24 disposed through the front wall 22 and an opening 25 disposed through the bottom wall 23. The funnels 18 are conventionally disposed upon the holes 24 in the front walls 22 of the shrouds 21. The shrouds 21 are conventionally attached to the wall and support structure 12 of the subway system tunnel 11 with the openings 25 in the bottom walls 23 being disposed upon the wall and support structure 12. Turbine generators 26 are conventionally mounted in the shrouds 21 and are adapted to transform wind to electrical power. The wind turbine generators 26 include support members 29 and turbine members 27 which are securely mounted upon the support members 29 and which are disposed in the shrouds 21 to effectively rotate upon the wind being accelerated into the shrouds 21 through the funnels 19.

In use, the wind turbine generators 26 generate electrical power as long as subway trains 28 speed through subway system tunnels 11 since wind is generated by the subway trains 28 and the wind-collecting ducts 13 funnel the wind into the shrouds 21 to rotate the turbine members 27 which effectively creates electrical power.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wind-generated power system comprising:
a subway system tunnel having a wall and support structure with wind being generated by subway trains passing or traveling at high rates of speed therethrough;
wind-collecting ducts being spaced throughout said subway system tunnel and being attached to the wall and support structure, each of said wind-collecting ducts including a wind intake opening and a wind outlet opening, and also including a venturi disposed near said wind outlet opening to accelerate the wind being collected through said wind intake opening, each said venturi being generally a funnel having a constricted passageway through which the wind is accelerated upon leaving said wind-collecting duct, each of said wind-collecting ducts being generally sinusoidal-shaped having a wind intake portion being disposed in said subway system tunnel, and further having a wind outlet portion being disposed upon the wall and support structure;

shrouds being mounted to the wall and support structure and being connected to said wind-collecting ducts, each of said shrouds including a front wall and a bottom wall, and also including a hole being disposed through said front wall and an opening being disposed through said bottom wall, said funnels being disposed upon said holes in said front walls of said shrouds, said shrouds being disposed upon the wall and support structure with said openings in said bottom walls being disposed upon the wall and support structure; and turbine generators being mounted in said shrouds and being adapted to transform wind to electrical power, said wind turbine generators including support members and turbine members which are securely mounted upon said support members and which are disposed in said shrouds to effectively rotate upon the wind being accelerated into said shrouds through said funnels.

2. A wind-generated power system comprising:

a subway system tunnel having a wall and support structure with wind being generated by subway trains passing or traveling at high rates of speed therethrough;

wind-collecting ducts being spaced throughout said subway system tunnel and being attached to the wall and support structure;

shrouds being mounted to the wall and support structure and being connected to said wind-collecting ducts; and turbine generators being mounted in said shrouds and being adapted to transform wind to electrical power.

3. A wind-generated power system as described in claim 2, wherein each of said wind-collecting ducts includes a wind intake opening and a wind outlet opening, and also includes a venturi disposed near said wind outlet opening to accelerate the wind being collected through said wind intake opening.

4. A wind-generated power system as described in claim 3, wherein each said venturi is generally a funnel having a constricted passageway through which the wind is accelerated upon leaving said wind-collecting duct.

5. A wind-generated power system as described in claim 4, wherein each of said wind-collecting ducts is generally sinusoidal-shaped having a wind intake portion being disposed in said subway system tunnel, and further having a wind outlet portion being disposed upon the wall and support structure.

6. A wind-generated power system as described in claim 4, wherein each of said shrouds includes a front wall and a bottom wall, and also includes a hole being disposed through said front wall and an opening being disposed through said bottom wall, said funnels being disposed upon said holes in said front walls of said shrouds, said shrouds being disposed upon the wall and support structure of the subway system tunnel with said openings in said bottom walls being disposed upon the wall and support structure.

7. A wind-generated power system as described in claim 6, wherein said wind turbine generators include support members and turbine members which are securely mounted upon said support members and which are disposed in said shrouds to effectively rotate upon the wind being accelerated into said shrouds through said funnels.

\* \* \* \* \*